July 23, 1963 A. W. NELSON ETAL 3,098,621
REEL WINDING APPARATUS
Filed April 25, 1961 3 Sheets-Sheet 3
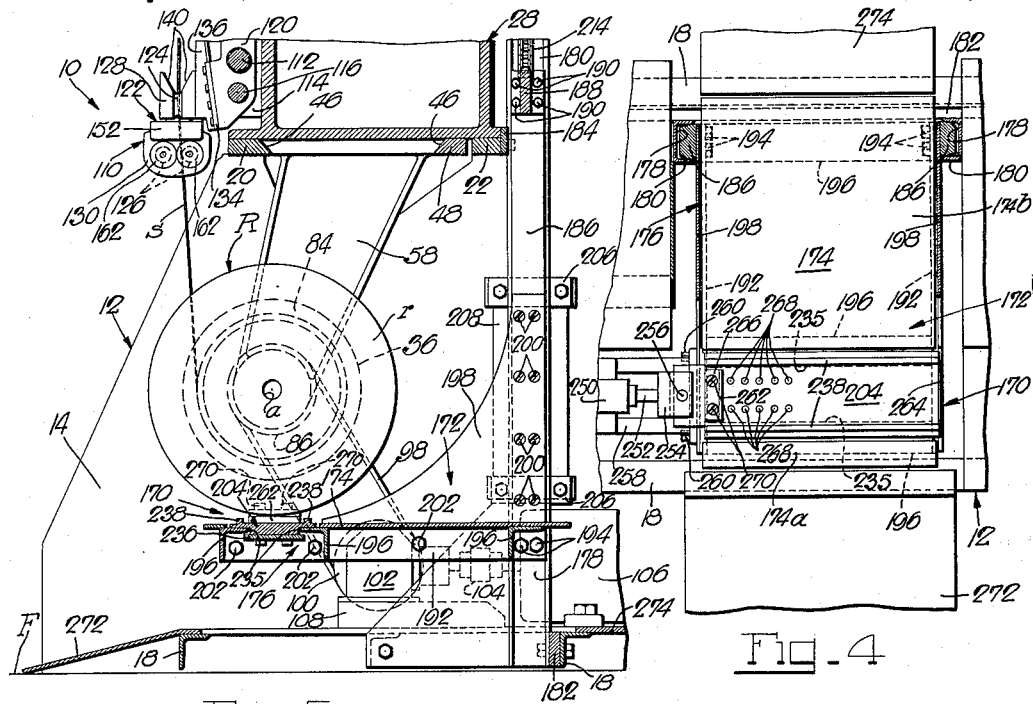
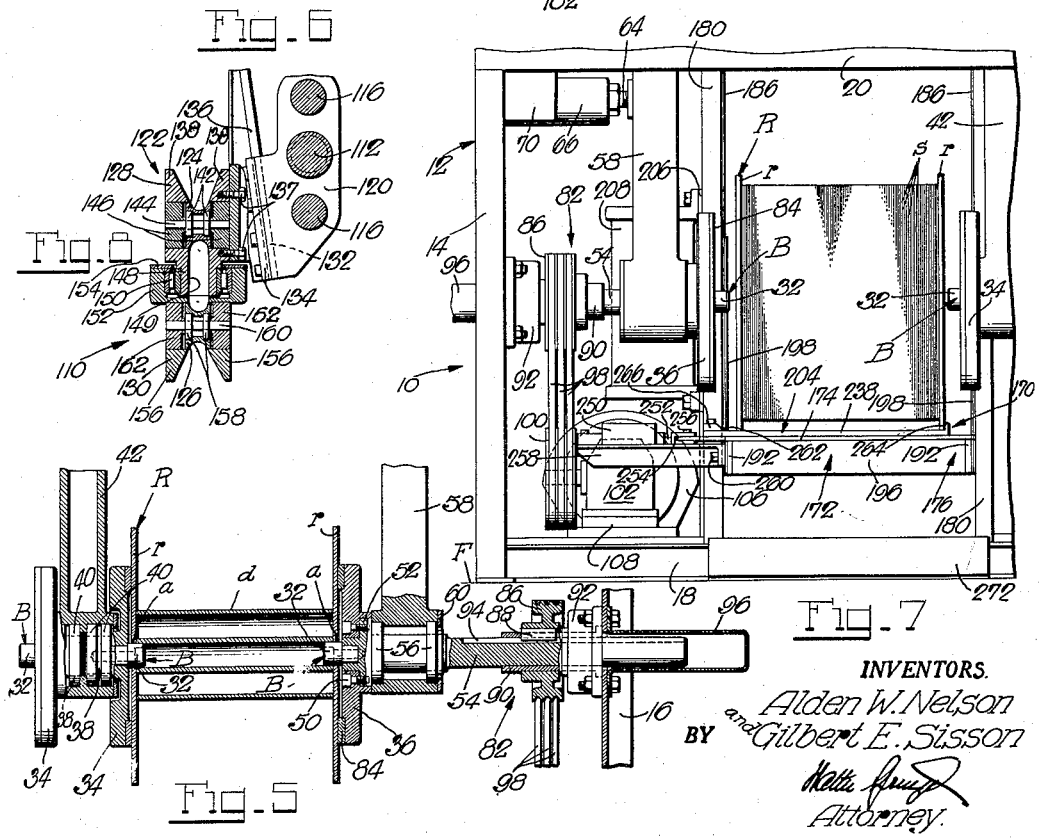
INVENTORS.
Alden W. Nelson
and Gilbert E. Sisson
BY
Attorney.

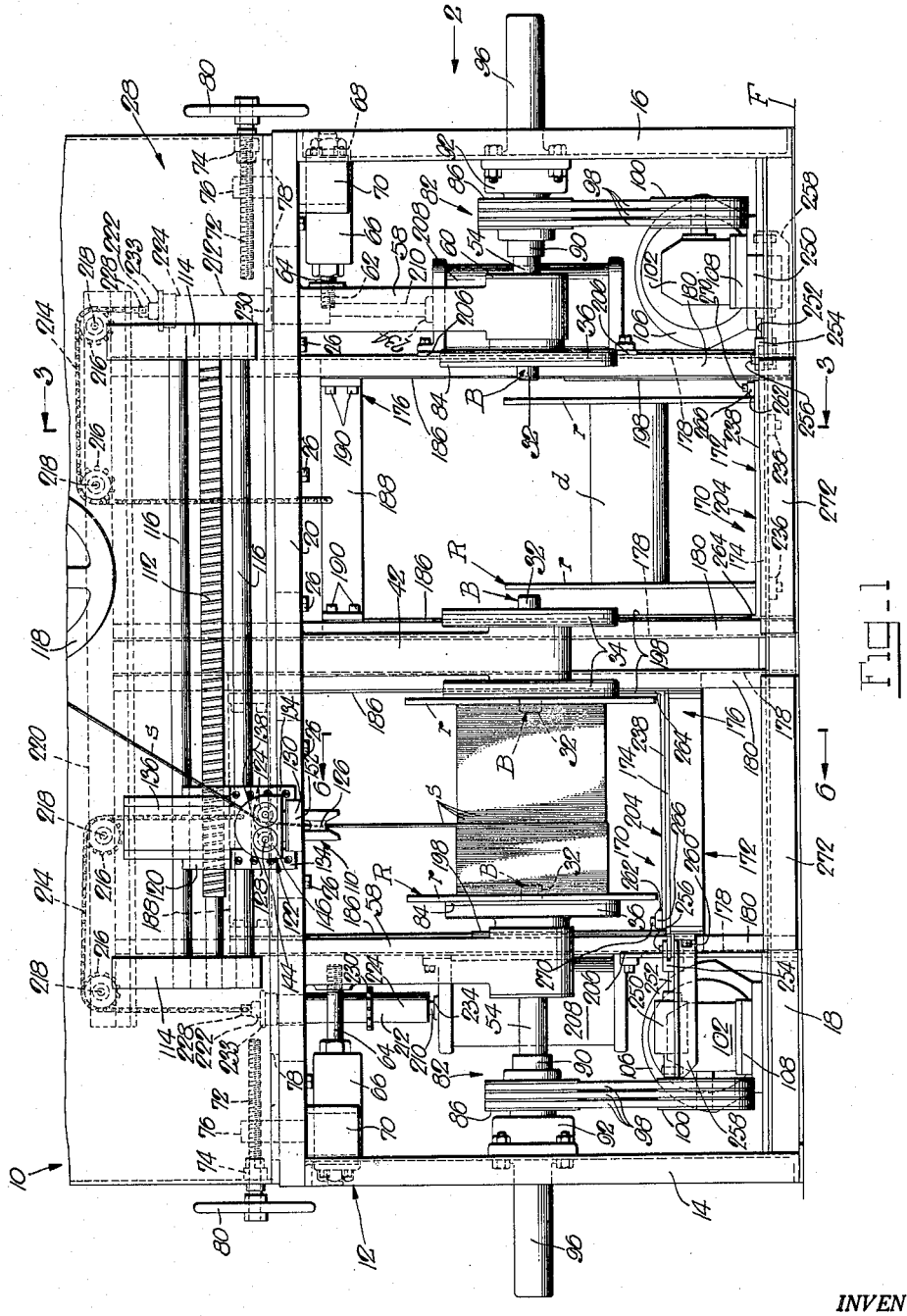

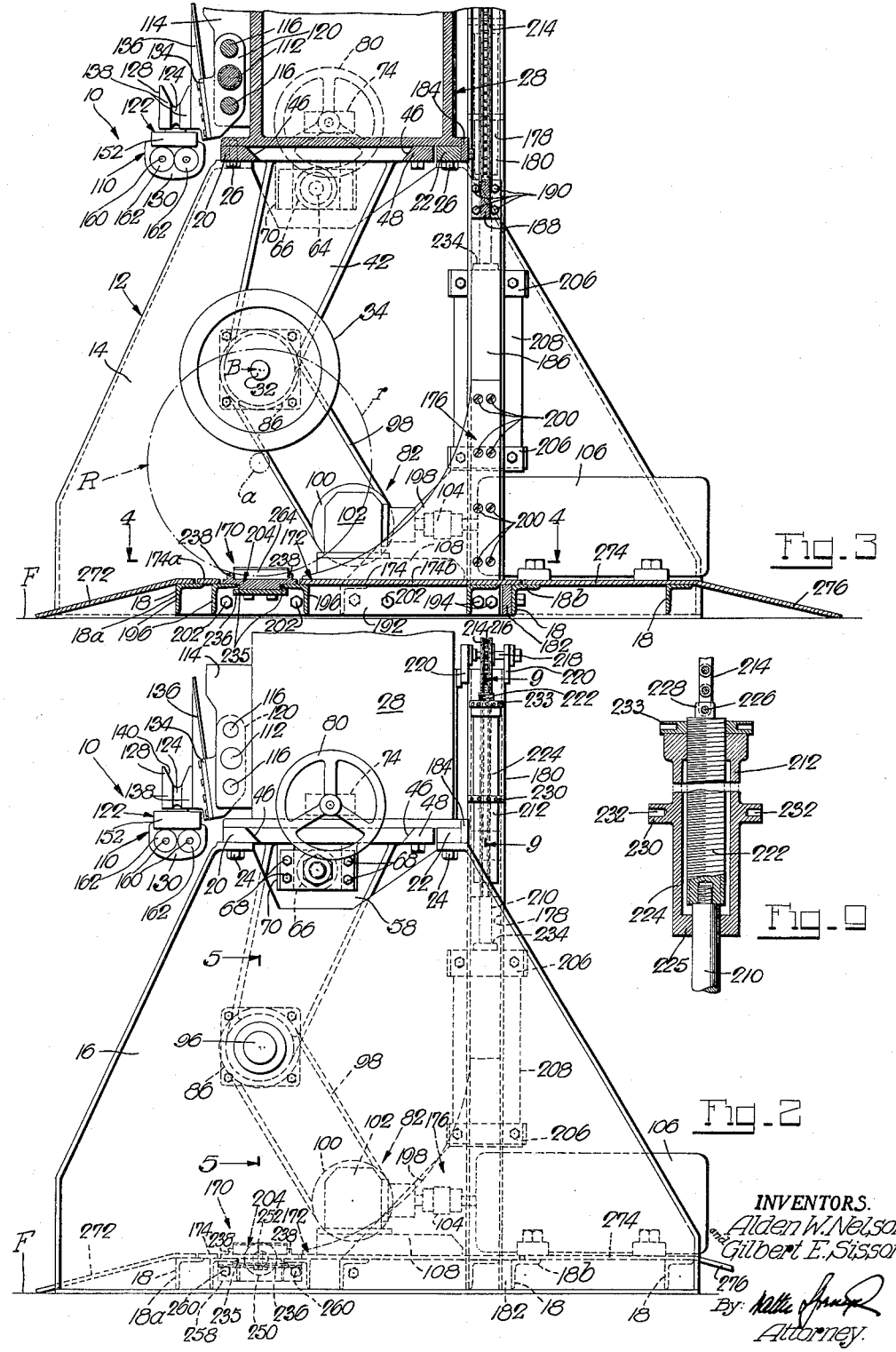

United States Patent Office 3,098,621
Patented July 23, 1963

3,098,621
REEL WINDING APPARATUS
Alden W. Nelson, West Mystic, and Gilbert E. Sisson, Mystic, Conn., assignors, by mesne assignments, to Crompton & Knowles Corporation, Worcester, Mass., a corporation of Massachusetts
Filed Apr. 25, 1961, Ser. No. 105,457
14 Claims. (Cl. 242—79)

This invention relates generally to reel winding apparatus and more particularly to apparatus for winding continuously fed flexible stock on reels.

Reel winding apparatus of the type to which the present invention relates takes in continuously delivered stock and winds it in predetermined lengths on successive reels for its convenient storage and transport until put to its ultimate used. To this end, the apparatus has provisions for removably supporting two reels side-by-side, one reel being wound at a time until full, whereupon the other reel is wound while the full reel is removed from the apparatus and replaced by an empty reel to be wound next. Reels are thus alternately wound in the apparatus and replaced by empty reels until a continuous stock supply is fully wound on reels. The reels in the apparatus are separately power-driven under suitable control, and the stock is directed into the respective reels in orderly lays by a traverse guide which moves back and forth for this purpose, and which also crosses over from wind-on relation with each full reel into wind-on relation with the adjacent empty reel so as to maintain the stock winding operation continuous. To this end, the drive of the empty reel is started when the other reel is nearly wound so that both reels will be driven when the other reel is fully wound and the traverse guide quickly crossed over into wind-on relation with the empty reel, with the cross-over stock between the reels being severed as soon as the stock is anchored to the empty reel either on winding the first few stock turns thereon or on being caught by mechanical snaggers on its stock cross-over rim.

For reel-exchange in winding apparatus of this type, empty and full reels are raised to and lowered from reel bearings which are in fixed elevated positions, and the reels are connected with and disconnected from the respective power drives while journalled in the reel bearings. While various expediencies are resorted to for thus interchanging reels of usually rather heavy weight, the task of interchanging the reels remains nevertheless a rather formidable and even potentially hazardous one, requiring much attention and considerable dexterous handling of the reels on the part of an operator.

It is the primary aim and object of the present invention to make provisions in reel winding apparatus of this type for interchanging reels quickly and safely without requiring their handling in any way by an operator, and in a manner which readily lends itself to automatic performance on simple manipulation of a remote control element or elements by an operator, thereby to eliminate all the drudgery and potential hazardous aspects of prior reel-exchange and reduce an operator's task in this respect to one of exceeding simplicity.

It is another object of the present invention to provide in reel winding apparatus of this type separate power elevators on which to raise and lower reels to and from the respective reel bearings, of which each elevator has a platform onto and from which to roll a reel directly from and onto the ground and the platform has a track onto which a reel is rolled for its accurate positioning with respect to the associated reel bearings so as to be in alignment with the latter on the subsequent rise of the elevator. With this arrangement, an operator's task in handling reels for their rise to and descent from the reel bearings and their operative alignment with the latter is reduced to mere rolling of the reels on the ground and platforms of the elevators which is neither time-consuming nor involves any potential hazard regardless of the weight or bulk of the reels.

It is a further object of the present invention to make provisions in reel winding apparatus with the aforementioned separate power elevators for transferring reels from each risen elevator to the associated reel bearings, and vice versa, and connecting and disconnecting them with and from the respective power drive, without requiring any handling by an operator of the reels or elevators or power drives. With this additional arrangement, each reel-exchange cycle involves neither handling of any operating parts and devices of the apparatus other than a remote control element or elements by the operator, nor his handling of reels other than their aforementioned mere rolling on the ground and platforms of the elevators.

Another object of the present invention is to arrange the aforementioned power elevators and their operating equipment in reel winding apparatus of this type entirely above the floor and so remote from the operating devices of the apparatus as to leave ample space for the most convenient arrangement of these operating devices and for their optimum performance.

A further object of the present invention is to provide in reel winding apparatus of this type for adjustability of the aforementioned power elevators and reel-transfer provisions for their adaptations to reels of infinite variations in size within relatively wide limits, thereby to conform the performance of the power elevators and reel-transfer provisions to the winding of reels of all different sizes of which apparatus of this type are capable.

It is another object of the present invention to make the aforementioned power elevators and reel-transfer provisions exceedingly simple in construction and of low cost, involving mostly standard stock and parts and most facile assembly.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of reel winding apparatus embodying the present invention;

FIG. 2 is a side view of the apparatus as seen in the direction of the arrow 2 in FIG. 1;

FIG. 3 is a transverse section through the apparatus taken substantially on the line 3—3 of FIG. 1;

FIG. 4 is a fragmentary section through the apparatus taken substantially on the line 4—4 of FIG. 3;

FIG. 5 is a fragmentary section through the apparatus taken substantially on line 5—5 of FIG. 2;

FIG. 6 is a fragmentary transverse section through the apparatus taken substantially on the line 6—6 of FIG. 1;

FIG. 7 is a fragmentary front view of the apparatus with certain operating devices thereof in different positions;

FIG. 8 is an enlarged section through a certain operating device of the apparatus; and FIG. 9 is an enlarged fragmentary section taken substantially on the line 9—9 of FIG. 2.

Referring to the drawings, and more particularly to FIGS. 1 to 3 thereof, the reference numeral 10 designates apparatus for winding continuous flexible stock s, such as wire or cable, onto reels R. To this end, the apparatus holds two reels of which one is being wound with stock while the other is in readiness to be wound with stock as soon as the first reel is fully wound, with the full reels being constantly replaced by empty reels to keep the winding operation continuous. The winding apparatus comprises a main frame 12 on which the various operating devices are mounted. The main frame 12 is, in the present instance, articulated and comprises opposite end standards 14 and 16, bottom braces 18 in the exemplary form of angles which may be welded or otherwise secured to the standards 14 and 16, and top braces 20 and 22 in the exemplary form of rails which may be bolted at 24 to the standards 14 and 16 (FIG. 2). Mounted on the top braces 20 and 22, as by bolts 26 (FIGS. 1 and 3), is a casing 28. The lower ends of the standards 14, 16 and the bottom braces 18 may appropriately be termed the base of the main frame.

The exemplary reels R which are to be wound in the present apparatus have the usual wind-on drum $d$ and opposite end rims $r$ (FIG. 5), with the end rims having central apertures $a$ for their bearing support in the apparatus. To the end of thus supporting the reels in winding position in the apparatus there is provided a pair of reel bearings for each reel. Since the bearings for both reels in the apparatus are identical, a detailed description of the bearings for one reel will be sufficient. Thus, referring to FIGS. 1 and 5, the bearings B for the right reel in the apparatus are in the form of pintles 32 having shoulders in the form of separate discs 34 and 36. Disc 34, from which one of the pintles 32 projects, has a shank 38 (FIG. 5) which is journalled and held against endwise movement in antifriction bearings 40 in a hanger 42 that is suitably locked in fixed position midway of the longitudinal extent of the main frame 12 (FIG. 1) in a dovetail guide 46 formed on the bottom of the casing 28 by the gib-like frame brace 20 and another gib 48 on the casing (FIG. 3). The other disc 36 is bolted at 50 to a collar 52 on a spindle 54 to which the other pintle 32 is secured and which is journalled in antifriction bearings 56 in another hanger 58 that is received with its top in the guideway 46 (FIGS. 2 and 3) and movable therein axially of the pintles 32. The spindle 54 is held against endwise movement on the hanger 58 by a retainer ring 60 (FIG. 5).

It follows from the preceding description that a reel R is supported in the apparatus in winding position by projecting the reel over the pintle 32 on the fixed hanger 42, whereupon the other hanger 58 is shifted from its retracted position (FIG. 1) into the position in FIG. 5 for projecting its pintle 32 into the reel. Conversely, the reel is released by retracting the hanger 58 with its pintle 32 sufficiently to permit removal of the reel from the opposite pintle 32. To the end of thus moving the hanger 58 in opposite directions in the guideway 46, the same is connected at 62 (FIG. 1) with the rod 64 of a piston in a fluid cylinder 66 which at 68 is mounted on a bracket 70 that is received in the guideway 46 (FIG. 2) and adjustable therein in a manner described hereinafter. Thus, on venting the left end of the cylinder 66 and admitting fluid under pressure to the right end thereof (FIG. 1), the hanger 58 will be shifted from its retracted position into the projected position in FIG. 5, and the hanger will be shifted oppositely on venting the right end of the cylinder 66 and admitting fluid under pressure into the left end thereof. In order to adapt the bearings B to reels of different widths, the cylinder-carrying bracket 70 is adjustable in the guideway 46 by means of a spindle 72 which is held rotatable but axially immovable in a bracket 74 in the casing 28 and threadedly received by a lug 76 that projects upwardly from the bracket 70 through an elongated slot 78 in the bottom of the casing 28 (FIG. 1). The spindle 72 projects to the outside of the casing 28 and is there provided with a handwheel 80 for its convenient manipulation. Wherever feasible, parts of the bearing arrangement for the other, left reel (FIG. 1) are denoted in the drawings by the same reference numerals as their counterparts of the above-described bearing arrangement.

Since the power drives 82 of the two reels in the apparatus are also identical, only one of these power drives will be described in detail, in this instance the one for the right reel in FIG. 1, which is also shown in part in FIG. 5. The particular power drive 82 includes the disc 36 as well as the spindle 54 of the described reel bearing arrangement, with the disc 36 being to this end provided with a reel-driving face in the form of a friction lining 84 for engagement with the adjacent reel rim, and with the spindle 54 being driven. The spindle 54 is to this end connected with a driven pulley 86 which is keyed at 88 to a sleeve 90 that is turnable but axially immovable in a bearing bracket 92 on the frame standard 16 (FIG. 5). The spindle 54 is axially slidable in the sleeve 90 and has a longitudinal groove 94 into which the key 88 projects to form a spline connection which permits the spindle 54 to shift with the hanger 58 while remaining drivingly connected with the axially immovable pulley 86 at all times. The operating region of the hanger 58 compels extension of the spindle 54 through the frame standard 16 and preferably into a protective cover 96 on the outside thereof. The pulley 86 is through belts 98 drivingly connected with another pulley 100 on the output shaft of suitable reduction gearing 102 the input shaft of which is coupled at 104 with an electric motor 106 (FIG. 2). The reduction gearing 102 and the motor 106 are mounted on a suitable platform 108 on the base of the main frame 12. Wherever feasible, parts of the power drive for the other, left reel (FIG. 1) are denoted in the drawings by the same reference numerals as their counterparts of the above-described power drive.

For leading stock $s$ onto each reel in orderly lays and also for crossing the stock from wind-on relation with one reel over into wind-on relation with the other reel, there is provided a traverse guide 110 on a power spindle 112 which is journalled with its ends in bearing brackets 114 on the front of the casing 28. The spindle 112 is threadedly received by the traverse guide 110 which is slidable on spaced parallel bars 116 axially of the reels in the apparatus and is also held by these bars against rotation with the power spindle 112. The guide bars 116 are with their ends firmly mounted in the bearing brackets 114. Thus, the traverse guide 110 will be shifted in opposite directions on rotation of the spindle 112 in opposite directions.

The traverse guide 110 is shown in FIG. 1 in the course of leading stock $s$ onto the left reel R, with the stock being led over a sheave 118 on top of the casing 28 to the traverse guide 110 which in its back-and-forth motion on the periodically reversing spindle 112 distributes the stock in orderly lays on the reel. The spindle 112 has a power drive as well as a suitable, preferably automatic, control for reversing the power drive, neither one of which is shown since the same form no part of the present invention. The same power drive and control will perform for winding each reel as well as for quickly crossing the stock from each fully-wound reel over into wind-on relation with the other empty reel in the apparatus.

Suitable controls (not shown) are also provided for rending the power drives 82 of the reels operative and inoperative and for actuating the cylinders 66 in proper sequence for uninterrupted winding of stock on reels in the apparatus. Thus, in continuing the exemplary operation of the apparatus in FIG. 1 in which stock $s$ is presently wound on the left reel, the adjacent empty right reel R is lifted to the level of and aligned with the associated reel bearings B, whereupon the associated cylinder 66 actuates to project its hanger 58 toward the empty reel to the end of closing the opposite pintles 32 and friction discs 34, 36 on the reel. The empty reel R is then supported on the pintles 32 and its rims $r$ are clamped between the friction discs 34 and 36 ready to be driven by the disc 36 on the next start of the associated power drive 82. As the left reel R is nearly fully wound, the power drive of the empty right reel is started so that both reels are driven at approximately the same speed as the traverse guide quickly crosses the stock s from the fully-wound reel over into winding relation with the empty reel. The stock will on its cross-over be deflected against the adjacent rims of the two reels and, in consequence, taken around with the same until sufficient initial windings of stock have been laid on the empty reel to anchor the stock thereon, whereupon a knife (not shown) is projected into the path of the crossover stock between the adjacent reel rims to sever the stock thereat. The power drive of the left full reel is then stopped and the left cylinder 66 thereupon actuated for the release of the full reel from the reel bearings B, whereupon the full reel is replaced by an empty reel, all while the right reel is being wound with stock under control of the traverse guide 110. The power drive 82 of the empty left reel is started shortly before the right reel is fully wound so that on cross-over of the stock by the traverse guide 110 from the fully-wound right reel to the empty left reel the cross-over stock will be taken around by both reels until the stock is securely anchored to the empty reel by its initial windings thereon, whereupon the aforementioned knife is again projected into the path of the spinning cross-over stock between the reels to sever the same. The power drive 82 of the full-wound right reel is then stopped and the reel replaced by an empty reel while the winding of the left reel with stock continues. The described cyclic performance of the apparatus in winding successive reels is thus repeated for winding subsequent reels.

The traverse guide 110 comprises a carrier 120 for a roll unit 122 of which the carrier is threadedly received on the power spindle 112 and slidable on the guide bars 116. The roll unit 122 comprises two pairs of companion stock-guiding rolls 124 and 126 in separate top and bottom brackets 128 and 130 of which the bottom bracket 130 is swiveled on the top bracket 128 and the latter is adjustably mounted on the carrier 120. Thus, the carrier 128 provides a guideway 132 in which is clamped in adjusted position by gibs 134 a slide 136 to which the top bracket 128 is bolted at 137 (FIG. 8). This bracket 128 has spaced cheeks 138 between which the rolls 124 extend with their cross-sectionally concave peripheries, with the adjacent surfaces 140 of the cheeks 138 being tapered to clear stock s passing to either of the rolls 124 in any and all operating positions of the traverse guide. The rolls 124 are journalled on antifriction bearings 142 on studs 144 which are mounted in this instance in steel inserts 146 in the cheeks 138. The top bracket 128 has a depending shank 148 on which is carried the inner race of an antifriction bearing 150 on the outer race of which is received the head 152 of the lower bracket 130, with the head 152 being held axially immovable on the outer bearing race by a retainer ring 154. The lower bracket 130, which is thus swivelled on the top bracket 128, has similar cheeks 156 between which extend the companion rolls 126 with their cross-sectionally concave peripheries. The rolls 126 are journalled on antifriction bearings 158 on studs 160 which are presently mounted in steel inserts 162 in the cheeks 156. Stock s passing to and over either of the rolls 124 in the top bracket 128 will pass through a bore 149 in the shank 148 of the top bracket to either one of the rolls 126 in the lower bracket 130 and from there to a reel.

The roll unit 122 is adjustable in the guideway 132 in the carrier 120 to permit positioning of the roll unit advantageously in close proximity to the reels in the apparatus regardless of the size or the reels. In thus adjusting the roll unit 122, the cross-over stock will assuredly be deflected into engagement with the adjacent rims of the reels in the apparatus and taken around by both reels long before the stock on the reel rim first crossed passes around the bottom of the same for the first time, thereby preventing hazardous whipping of the stock back and forth by the reel rim first crossed and also possible snapping apart of the stock in consequence. In view of this explanation, it appears that the roll unit 122 in FIGS. 1 and 6 is not shown adjusted to best advantage for the size of the exemplary reel R being wound and that the roll unit would advantageously be adjusted into much closer proximity to this reel.

The arrangement of dual pairs of rolls 124 and 126 in the traverse guide 110 is further advantageous in subjecting the stock s to the least friction on its passage through the traverse guide in any of its operating positions. Thus, the stock s passing from the sheave 118 (FIG. 1) to the top rolls 124 travels in a plane which is substantially normal to the axes of these rolls (FIG. 6), and the swivelled bracket 130 will be turned into any position by the passing stock in which the same encounters the least friction from either of its rolls 126, the latter being due to the fact that the nearest peripheral parts of these rolls 126 are equally spaced from the swivel axis of the lower bracket 130.

The present reel winding apparatus also features reel loading and unloading mechanisms 170, including reel elevators 172, for the left and right reels in the apparatus. Since these mechanisms are identical, only the mechanism for the right reel (FIG. 1) will be described in detail. However, for a clearer understanding of the construction of these mechanisms from the following description of the mechanism for the right reel, reference will occasionally be had to FIG. 4 despite the fact that the same shows the mechanism for the left reel. Thus, the elevator 172 for the right reel (FIG. 1) has a reel-supporting surface which in the present instance is a reel platform 174 on the lower horizontal leg or base of a generally L-shaped elevator framework 176 (FIGS. 2 and 3) which with its other, vertical leg is slidable in an elevator guide 178 (FIGS. 1 to 4). The elevator guide 178 is, in the present instance, formed by spaced upright channels 180 which face each other (FIG. 4) and are mounted on the frame 12 in rear of the casing 28 thereof. Thus, the channels 180 are at the bottom suitably secured to a rail 182 on one of the angle braces 18 of the main frame (FIGS. 3 and 4), and they are further secured higher up to a side rail 184 on the top brace 22 of the main frame (FIGS. 2 and 3). The vertical leg of the elevator framework 176 is formed by two spaced rails 186 which rise from the horizontal leg thereof and are slidably received in the channels 180, and a crossbar 188 which extends between the rails 186 at the top thereof and is bolted thereto at 190. The horizontal leg of the elevator framework 176 comprises side bars 192 which are bolted at 194 to the rails 186, and angle braces 196 which extend across the side bars 192 and are suitably secured thereto, as by welding, with the elevator framework being further reenforced and braced across the legs thereof by heavy side plates 198 (FIGS. 1 to 4) which at 200 are screwed to the upright rails 186 and at 194 and 202 bolted to the side bars 192 (FIG. 3). The reel platform 174 is arranged in two parts 174a and 174b (FIGS. 3 and 4) which may be welded or otherwise secured to the horizontal leg of the elevator framework 176, and which are spaced sufficiently to admit between them a slided 204 to be described.

For operating the described elevator 172, there is bolted to spaced plates 206 in the rear of the right guide channel 180 (FIG. 1) a fluid cylinder 208 with a piston having a rod 210 which through an elevator stop 212 to-be-described and a chain 214 is connected with the crossbar 188 of the elevator framework 176. The chain 214 passes over guide sprockets 216 on shaft 218 which are journalled in spaced rails 220 (FIGS. 1 and 2) that are suitable secured to the sides of the guide channel 180. Thus, on venting the top end of the cylinder 208 and admitting fluid under pressure into the bottom end thereof, the elevator 172 is moved to its lower position in which the reel platform 174 rests on frame base, and more particularly on the top flanges of the angle braces 18a and 18b thereof (FIGS. 2 and 3). Conversely, on venting the bottom end of the circular 208 and admitting fluid under pressure into the top end thereof, the elevator 172 is moved to its raised position.

The stop 212 serves for adjustment of the elevator 172 in its upper position to adapt the same to reels of different rim diameters. To this end, the stop 212 comprises a threaded spindle 222 and a stop member 224 (FIG. 9). The spindle 222 is secured to the piston rod 210 to form an upward extension thereof, and the chain 214 is pinned at 226 to a lug 228 at the top end of this spindle. The stop member 224, which is in the form of a shell, is with its bottom 225 guided on the piston rod 210 and is with its top threadedly received by the spindle 222 for axial adjustment thereon. For turning the stop member 224 to this end, the same is provided with a collar 230 having holes 232 into which to project a suitable tool. A nut 233 serves to lock the stop member 224 in any adjusted position on the spindle 222. The length of the chain 214 is such that the elevator 172 rests with its platform 174 on the frame base when the piston in the cylinder 208 is in its upper end position therein. On the other hand, the stop member 224 is so adjusted on the spindle 222 that on the downstroke of the piston in the cylinder 208 the stop member will with its bottom 225 engage a companion stop member, in this instance a boss 234 on the cylinder, and thus come to rest in a desired raised position of the elevator in which a reel thereon of a given rim diameter is with its rim apertures at the level of the reel bearings B. Accordingly, while the stop members 224 and 234 in no wise control the lower elevator position which is invariable, these stops members do control the stroke length of the elevator, and, hence, its upper position.

The aforementioned slide 204 on the described elevator framework 176, which forms part of the reel loading and unloading mechanism 170, is adapted to locate a reel R so that it is with its rim apertures $a$ in axial alignment with the reel bearings B in the upper elevator position, and is further adapted to shift a reel onto and from the reel bearings. To this end, the slide 204 is guided for movement axially of the reel bearings B in a way 235 provided by the top flanges of the front angle braces 196 of the elevator framework 176 (FIGS. 2 to 4), with bottom gibs 236 on the slide 204 serving to retain the latter in its guideway 235. The slide 204 is at its top provided with spaced ribs or ridges 238 onto which a reel on the elevator platform 174 is to be rolled and on which its rim apertures $a$ will come into axial alignment with the reel bearings B on movement of the elevator into its upper position.

Assuming now that an empty reel R has been rolled onto the ribs 238 on the slide 204 in the lower elevator position (FIGS. 1 and 3), the elevator 172 will on actuation of the cylinder 208 be moved into its upper position (the same as that of the other elevator in FIG. 7). As the elevator reaches its upper position, the rim apertures of the reel thereon are in axial alignment with the adjacent bearing pintles 32. The slide 204 with the reel thereon may then be shifted in its guideway 235 to the left (FIG. 1) in order to project the reel over the fixed, left bearing pintle 32. Then, with the reel still supported on the slide 204 in the upper elevator position, the cylinder 66 is actuated to shift the retracted hanger 58 to the left (FIG. 1) so as to close with its pintle 32 and drive disc 36 on the reel. The elevator 172 may then be lowered to a position similar to that of the other elevator in FIGS. 1 and 6 in order to clear the reel for its power drive and wind-on of stock. As the reel is fully wound with stock and its power drive has stopped, the elevator 172 is again raised to its upper reel-supporting position and the cylinder 66 actuated to shift the hanger 58 into its retracted position in which its pintle 32 and drive disc 36 are withdrawn from the reel, whereupon the slide 204 is shifted in its guideway 235 to the right (FIG. 1) in order to carry the reel off the left bearing pintle 32. The fully-wound reel is now clear of both bearing pintles 32 and the elevator 172 with the reel thereon may next be lowered on actuation of the cylinder 208 to that end.

For moving the slide 204 in its guideway 235, there is provided a fluid cylinder 250 and a piston therein the rod 252 of which carries a clevis 254 that is connected at 256 with the slide 204 (FIGS. 1, 2 and 4). The cylinder 250 is carried by a bracket 258 which at 260 is bolted to the elevator 172 and, hence, movable therewith.

While the above-described transfer of a reel by the slide 204 from the elevator onto the reel pintles 32, and vice versa, is feasible, it is preferable to provide on the slide shoulders 262 and 264 (FIG. 1) of which shoulder 262 is adapted to engage the adjacent reel rim for positively holding the reel against retraction with the hanger 58, and shoulder 264 is adapted to engage the adjacent reel rim and positively retract the reel from the fixed pintle 32 on movement of the slide to the right (FIG. 1). The shoulder 262 is formed by a mounted stop member 266 on the slide 204 while the other shoulder 264 is formed on the slide itself at the end thereof nearest to the fixed hanger 42.

FIG. 1 shows the slide 204 for the right reel in its projected position, i.e., on venting the left end of its cylinder 250 and admitting fluid under pressure into the right end thereof. A reel may be rolled from the elevator platform 174 onto the slide 204 in this projected position and the slide may remain in this position for loading the reel onto the bearing pintles 32 in the upper elevator position which may be accomplished solely by the hanger 58 on its projection to the left (FIG. 1). After the reel is fully wound with stock and its power drive stopped, the elevator may be raised with its slide 204 into supporting engagement with the reel with the slide still in its projected position. On subsequent retraction of the hanger, the reel will most likely remain on the fixed left pintle 32 owing to the fact that it also rests on the slide 204. However, if the reel should perchance follow the retracting hanger 58, its right rim will move against the shoulder 262 on the slide and the reel, in consequence, be removed from the pintle 32 on the hanger 58 before the latter reaches its retracted position, as will be readily understood. In the latter case, the reel will also already have been removed from the fixed left pintle before its removal from the other pintle. However, if the reel remains on the fixed left pintle on retraction of the hanger 58, the shoulder 264 on the slide 204 will remove the reel from this fixed pintle on movement of the slide into its retracted position, as will be readily understood. Thus, the reel will be removed from the pintles in any event.

With the retraction stroke of the slide 204 being adequate to remove a reel of any width from the fixed left pintle 32, the slide may readily be adapted to unloading reels of different widths by mere adjustment of the stop member 266 on the slide. To this end, each slide 204 is in the present instance provided with longitudinally spaced pairs of holes 268 for receiving the mounting bolts 270 of the stop member 266 (FIG. 4).

Wherever feasible, parts of the loading and unloading mechanism 170 for the left reel (FIG. 1) are denoted in the drawings by the same reference numerals as their counterparts of the above-described mechanism 170 for the other, right reel.

The elevator and slide operating cylinders 208 and 250 have suitable valve controls (not shown) for their performance in conformity with the aforementioned cyclic stock winding performance of the apparatus on successive reels. Also since the reel platform 174 of each elevator 172 rests on the base of the main frame 12 in the lower elevator position (FIGS. 2 and 3), there are provided at the front of the main frame 12 ramps 272 on which to roll reels from the floor F onto the elevator platforms 174, and vice versa. These ramps 272 are suitably secured to the nearest angle brace 18a of the main frame. In the present instance also, there are suitably mounted on angle braces 18 in the rear of the main frame platforms 274 which are substantially continuous with the reel platforms 174 in the lower elevator positions and terminate in ramps 276 that lead to the floor F. Accordingly, empty reels may be rolled from the floor onto the reel platforms 174 in the lower elevator positions from one side of the apparatus, while fully-wound reels may be rolled from the reel platforms onto the ground on the opposite side of the apparatus.

The particular arrangement of the elevators 172 is advantageous for several reasons. Thus, the general L-construction of each elevator (FIG. 3) permits the location of the greater part of its bulk and of its entire guide in the rear of the main frame 12 and, hence, remote from the space in which are arranged and perform such prominent operating devices as the reel bearings on the hangers, the operating cylinders for the outer hangers, the major parts of the power drives of the reels and the projectional knife (not shown) for severing the cross-over stock between the reels. Further, the construction of the upright leg of each elevator frame work 176 in the open gate-like form shown in FIG. 1 permitted the arrangement of the fixed reel platforms 274 and their additional ramps 276 in the rear of the main frame 12. Also, the reel elevators 172 and their guides as well as power equipment are arranged entirely above the floor and carried in their entirety on the main frame 12. Of course, the additional power-operated reel slide 204 on each elevator 172 affords the ultimate in quick, accurate and hazardless exchange of reels in the apparatus.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In reel winding apparatus, the combination with a frame, of axially aligned bearings on said frame for rotary support of a reel above the floor, with one of said bearings being axially movable in first and second directions into reel supporting and releasing positions, respectively; an elevator having a base and a slide with a reel track on said base, said elevator being guided on said frame for movement into lower and upper positions in which said base is substantially on the floor for rolling a reel therefrom onto said slide track and a reel on said slide track is between said bearings and with its axis in alignment with the bearing axis, respectively, and said slide being guided on said base for movement in said first and second directions to bring a reel on the track thereof into and from supporting relation, respectively, with the other bearing in said upper elevator position; first and second devices for moving said one bearing and operating said elevator, respectively, and means for moving said slide.

2. The combination in reel winding apparatus as set forth in claim 1, which further comprises a shoulder on said slide track for positively withdrawing a reel from said other bearing on movement of said slide in said second direction in said upper elevator position.

3. The combination in reel winding apparatus as set forth in claim 1, which further comprises a shoulder on said slide track for blocking a reel on said slide track in said upper elevator position against movement with said one bearing in said second direction.

4. The combination in reel winding apparatus as set forth in claim 1, which further comprises a shoulder on said slide track for positively withdrawing a reel from said other bearing on movement of said slide in said second direction in said upper elevator position, and another shoulder on said slide track for blocking a reel on said slide track in said upper elevator position against movement with said one bearing in said second direction.

5. The combination in reel winding apparatus as set forth in claim 1, in which said elevator base is a reel roll-on platform.

6. The combination in reel winding apparatus as set forth in claim 1, in which said one bearing is guided on said frame for axial movement, and said first device is a fluid cylinder and a piston therein connected with said one bearing, with said cylinder being mounted on said frame for adjustment axially of said bearings for adaptation of the latter to reels of different sizes.

7. The combination in reel winding apparatus as set forth in claim 1, in which said means is power-operated to move said slide back and forth through a given stroke, and there is further provided a stop on said slide track for blocking a reel on said slide track in said upper elevator position against movement with said one bearing in said second direction, with said stop being adjustable on said slide track longitudinally thereof for its adaptation to reels of different sizes.

8. The combination in reel winding apparatus as set forth in claim 1, in which said second device is power-operated and adjustable to move said elevator into upper positions at different levels above the floor for adapting the elevator to reels of different sizes.

9. In reel winding apparatus, the combination of a longitudinal frame with a base; axially aligned bearings on said frame for rotary support of a reel above the floor, with one of said bearings being axially movable longitudinally of said frame in first and second directions into reel supporting and releasing positions, respectively; a reel loading installation comprising upright guide means on said frame spaced laterally from said bearings, an L-shaped elevator with two legs of which one leg is received in said guide means and the other leg is a substantially horizontal reel platform underneath said bearings, a slide guided on said platform for movement axially of said bearings and having a track onto which to roll a reel on said platform, said elevator being in said guide means movable into lower and upper positions in which said platform rests on said frame base and a reel on said slide track is between said bearings and with its axis aligned with the bearing axis, respectively, and power devices on said frame and elevator for operating said elevator and slide, respectively; and a reel ramp on said frame leading from the floor laterally of said frame to said platform in said lower elevator position.

10. In reel winding apparatus, the combination of a longitudinal frame with a base; axially aligned bearings on said frame for rotary support of a reel above the floor, with one of said bearings being axially movable longitudinally of said frame in first and second directions into reel supporting and releasing positions, respectively; a reel loading installation comprising upright guide means on said frame on one side of said bearings, an L-shaped elevator with two legs of which one leg is received in said guide means and the other leg is a substantially horizontal reel platform underneath said bearings, a slide guided on said platform for movement in said first and second directions and having a reel-locating track onto which to roll a reel on the platform, said elevator being in said guide means movable into lower and upper positions in which said platform rests on said base and a reel on said slide track is between said bearings and with its axis aligned with the bearing axis, respectively; and power devices on said frame and elevator for operating said elevator and slide, respectively; power means on said frame for moving said one bearing; and a reel ramp on said frame on the other side of said bearings leading from the floor laterally of said frame to said platform in said lower elevator position.

11. The combination in reel winding apparatus as set forth in claim 10, in which said guide means are upright channels spaced longitudinally of said frame, said one elevator leg is formed by uprights received in said channels and spaced from each other sufficiently to pass a reel between them, and there is provided on said frame and on said one side of the bearings another reel ramp leading from the floor laterally of said frame to said platform in said lower elevator position.

12. In reel winding apparatus, the combination of a longitudinal frame; axially aligned bearings on said frame for rotary support of a reel above the floor, with one of said bearings being axially movable longitudinally of said frame in first and second directions into reel supporting and releasing positions, respectively; power means on said frame for moving said one bearing; and a reel loading installation comprising upright guide means on said frame on one side of said bearings, an L-shaped elevator with two legs of which one leg is received in said guide means and the other leg extends from the lower end of said one leg and is a substantially horizontal reel platform underneath said bearings, a slide guided on said platform for movement in said first and second directions and having a reel-locating track onto which to roll a reel on the platform, said elevator being in said guide means movable into lower and upper positions in which to roll a reel on the floor onto said platform and a reel on said slide track is between and axially aligned with said bearings, respectively, a power device on said elevator for operating said slide, an upright fluid cylinder on said guide means and a piston therein with an upwardly projecting rod, and an operating connection between said piston rod and elevator comprising guide sprockets on said frame above said elevator and a chain passed over said sprockets and secured with its ends to said piston rod and to the upper end of said one elevator leg.

13. The combination in reel winding apparatus as set forth in claim 12, which further comprises two stops of which one stop is fixed on said frame and the other stop is carried by said piston rod above said one stop and engages the latter in said upper elevator position, and said other stop is adjustable on said piston rod for adjustment of the upper elevator position at different levels above the floor.

14. The combination in reel winding apparatus as set forth in claim 12, in which said guide means are upright channels spaced longitudinally of said frame on one of which said cylinder is mounted, and said one elevator leg is formed by uprights received in said channels and a crossbar connecting said uprights at their upper ends, with said uprights spaced from each other and said crossbar spaced from said platform sufficiently to pass a reel between said uprights and underneath said crossbar in said lower elevator position, and said chain is with one end thereof secured to said crossbar.

References Cited in the file of this patent

UNITED STATES PATENTS

| | | |
|---|---|---|
| 1,960,452 | Parsons | May 29, 1934 |
| 2,624,522 | Van Hook | Jan. 6, 1953 |
| 2,652,206 | Baechli | Sept. 15, 1953 |
| 2,779,545 | Hauck et al. | Jan. 29, 1957 |
| 2,893,652 | Davis | July 7, 1959 |